United States Patent [19]
Schmaling et al.

[11] Patent Number: 5,499,903
[45] Date of Patent: Mar. 19, 1996

[54] SNUBBER BEARING MOUNTING ASSEMBLY FOR BEARINGLESS ROTORS

[75] Inventors: David N. Schmaling, Oxford; Frederick J. Miner, Torrington, both of Conn.; Francis E. Byrnes, White Plains, N.Y.

[73] Assignee: United Technologies Corporation, Hartford, Conn.

[21] Appl. No.: 324,559

[22] Filed: Oct. 18, 1994

[51] Int. Cl.$^6$ .................................................. B64C 27/00
[52] U.S. Cl. .................................................. 416/134 A
[58] Field of Search .................................... 416/134 A

[56] References Cited

U.S. PATENT DOCUMENTS

| | | | |
|---|---|---|---|
| 4,676,720 | 6/1987 | Niwa et al. | 416/134 A |
| 4,975,021 | 12/1990 | Wagner et al. | 416/134 A |
| 5,092,738 | 3/1992 | Byrnes et al. | 416/134 A |
| 5,110,259 | 5/1992 | Robinson | 416/134 A |
| 5,120,195 | 6/1992 | Schmaling et al. | 416/134 A |

*Primary Examiner*—John T. Kwon
*Attorney, Agent, or Firm*—Brian A. Collins

[57] ABSTRACT

A mounting assembly (100) is provided for securing a helicopter snubber bearing (70) to a bearingless rotor assembly (10) which includes a flexbeam connector (22) mounted to a torque drive hub member (18). The mounting assembly (100) includes a retainer fixture (102) for mounting a retainer (104) which engages an inner bearing race portion (88) of the snubber bearing (70). The retainer fixture (102) is mounted to the flexbeam connector (22) and includes an inboard end portion (112), a restraint portion (114) extending radially outboard thereof, and a seat portion (116) disposed therebetween. The retainer (104) is disposed in register with, and is compliantly bonded to, the seat portion (116) of the retainer fixture (102), and furthermore abuts the restraint portion (114) which provides redundant retention therefor. To reduce bondline stresses, the retainer (104) includes at least one stress relieving lateral slot (132) and at least one stress relieving forward slot (134), which cooperates with a radial slot (156) formed in the retainer fixture (102), to reduce shear and tensile stresses in the compliant adhesive (130). Furthermore, the seat portion (116) of the retainer fixture (102) is reduced in width dimension to reduce flap and pitch induced shear stresses. The mounting assembly (100) provides redundant load paths for transferring centrifugal loads acting on the snubber bearing (70) to the flexbeam connector (22) or, alternatively, to the central torque drive hub member (18).

18 Claims, 8 Drawing Sheets

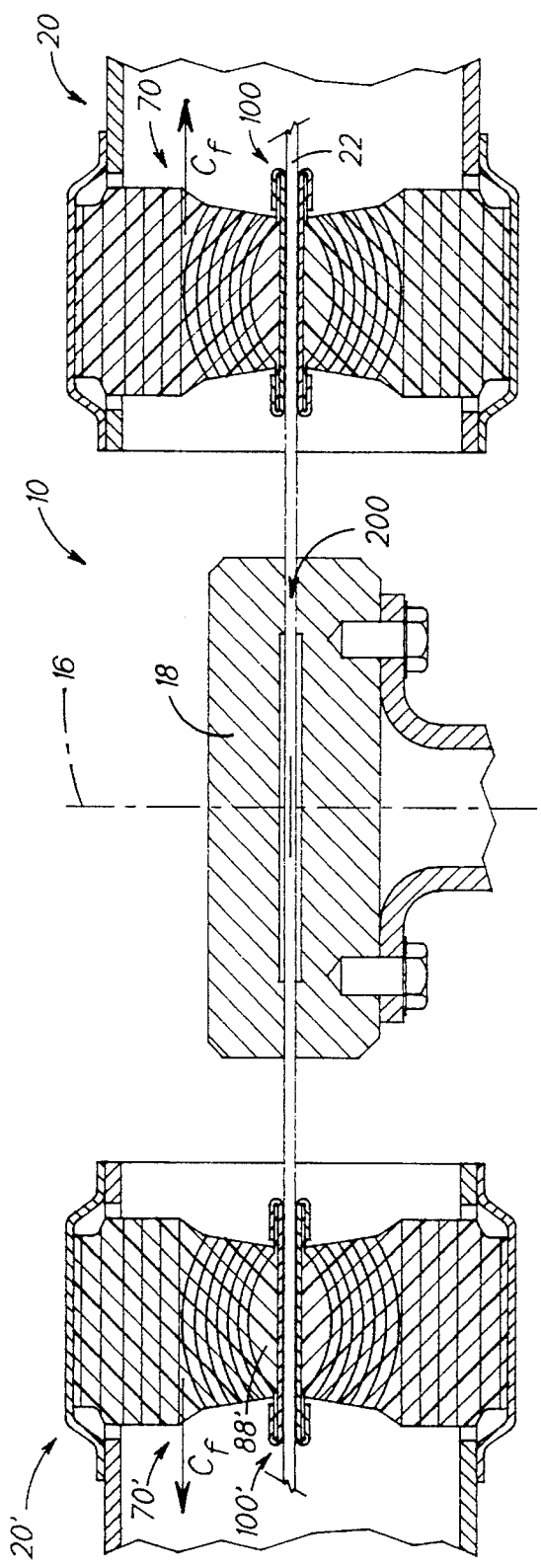
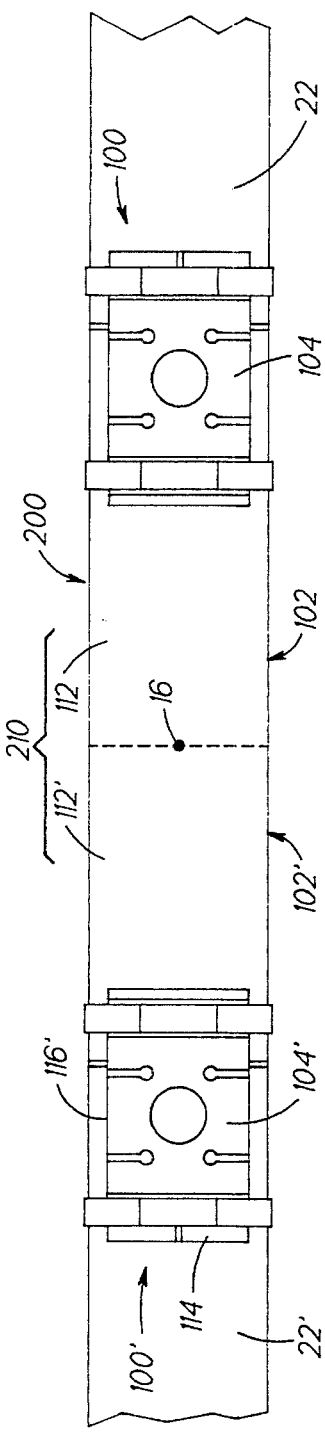
FIG. 8a
FIG. 8b

SNUBBER BEARING MOUNTING ASSEMBLY FOR BEARINGLESS ROTORS

The Government has rights in this invention pursuant to Contract No. DAAJ09-91-C-A004 awarded by the Department of the Army.

TECHNICAL FIELD

The present invention relates to helicopter bearingless rotors and, more particularly, to such rotors having a snubber bearing between a flexbeam connector and enveloping torque tube and, more particularly, to a new and useful assembly for mounting the snubber bearing to the flexbeam connector.

BACKGROUND OF THE INVENTION

Helicopter rotor designs are increasingly utilizing a flexible structural member, commonly termed a "flexbeam" or "flexbeam connector", for retention of a helicopter rotor blade to a torque drive hub member. Basic operational constraints of rotary wing flight impose substantial functional complexity upon the rotor flexbeam necessitated by the need to control accurately multi-directional displacement of the rotor blades, i.e., flapwise and edgewise bending, and torsional or pitch change motions. As such, these configurations are termed "Bearingless Rotors" inasmuch as they replace antiquated bearing element rotors which accommodate motion by hinge or journal type bearings at the rotor blade root end. The flexbeam connector, which is typically comprised of fiber reinforced resin matrix materials, reduces the weight, complexity, and maintenance of the rotor assembly while, furthermore, improving the reliability and damage tolerance thereof.

Bearingless rotors of the varieties described in U.S. Pat. Nos. 4,244,677, and 5,092,738 typically include a torque tube enveloping each of the flexbeam connectors for imparting pitch motion to the rotor blades. The torque tube rigidly mounts outboard to the root end of the rotor blade and articulately mounts inboard to the upper and lower surfaces of the flexbeam connector. The articulate mount is effected by upper and lower snubber bearings which perform the functions of centering the torque tube relative to the flexbeam connector for pitch change and flapping motion, accommodating lead-lag motion between the torque tube and flexbeam connector and transferring pitch control and other loads therebetween. The snubber bearings are internally mounted within the torque tube and interposed between surfaces of the flexbeam connector and upper and lower portions of the torque tube. The snubber bearings are typically comprised of a plurality of spherical and flat elastomeric laminates, which spherical laminates accommodate pitch change and flapwise bending motion and which flat laminates permit a small degree of radial and a larger degree of edgewise motion. The flat laminates are, furthermore, comprised of high loss elastomer material for providing edgewise or lead-lag vibration damping.

Each snubber bearing includes inner and outer race portions which, respectively, correspond to the flexbeam and torque tube mounting locations. The inner race of each snubber bearing is typically mounted to a retainer which is affixed to the upper and lower surfaces of the flexbeam connector. Insofar as such location is generally inaccessible for mounting purposes, the inner race commonly includes radially extending tabs for slideably engaging slots or channels formed in the retainer. Such sliding engagement facilitates ease of assembly and replacement. The accessibility of the outer race portions of the snubber bearings permits attachment by more conventional means e.g., a bolted attachment.

Since the inboard section of the flexbeam connector is exposed to high levels of axial, bending and torsional stress, it is preferable to bond the retainers to the flexbeam connectors to avoid stress inducing apertures therein such as those necessary for a bolted attachment. Furthermore, the retainers are typically formed from metal stock to facilitate machining of the channels which accepts the inner race tabs of the snubber bearings.

While such bonded metal retainers are satisfactory for lightly loaded structural applications, e.g., helicopter tail rotors, their use in highly loaded applications, e.g., main rotors, is more problematic. The effects of flexbeam motion and increased loads associated with a more demanding operational environment generate high shear stresses within the bondline between the retainer and the flexbeam connector. For example, it will be appreciated that the size and mass of the snubber bearings are proportionally larger in helicopter main rotor applications and, consequently, produce higher centrifugal loads. Inasmuch as these centrifugal loads are reacted in shear across the bondline, high shear stresses are developed therein which can result in bondline failure. Furthermore, high strain levels associated with the large flapwise and torsional motion of a main rotor flexbeam connector induces large shear loading within the bondline which exacerbates the problem of bondline failure. Other sources of bondline failure relate to the high axial strain generated by the high blade-induced centrifugal loads acting on the flexbeam connector. Insofar as the modulus of the metal-formed retainer is substantially higher than the composite-formed flexbeam connector, bondline shear stresses are developed due to the differences in material properties. That is, the composite-formed flexbeam connector elongates at a significantly higher rate than the metal retainer under the same applied load, which elongation must be accommodated in the bondline area.

Should bondline failure occur, the retainer and inner race of the snubber bearing will shift under the influence of the various imposed loads. As a result, the dislocated snubber bearing may adversely affect the degree of pitch control available, introduce undesired pitch control inputs, change the natural flapwise and edgewise frequencies of the rotor blade, and/or impair the damping efficacy of the snubber bearing.

Byrnes et al. U.S. Pat. No. 5,092,738 describes a mounting assembly for securing a retainer of the type described above which employs composite wrap members for preventing motion of the retainer in the event of a bondline failure. While the wrap members prevent lateral motion of the retainer, such retention is ineffective for preventing spanwise or axial displacement of the snubber bearings.

A need, therefore, exists for providing an improved mounting assembly for securing a snubber bearing to a bearingless rotor assembly which minimizes bondline stresses and, furthermore, provides redundant retention.

DISCLOSURE OF INVENTION

It is an object of the present invention to provide an improved mounting assembly for securing a snubber bearing to a flexbeam connector which reduces bondline shear stresses due to flexbeam motion.

It is another object of the present invention to provide an improved mounting assembly for securing the snubber bearing to the flexbeam connector which minimizes shear stresses generated by material property differences (i.e., modulus) between the flexbeam connector and the retainer.

It is yet another object of the present invention to provide an improved mounting assembly which provides redundant load paths for reacting centrifugal loads acting on the snubber bearing.

It is still another object of the present invention to provide an improved mounting assembly wherein centrifugal loads acting on the snubber bearing are redundantly reacted by a torque drive hub member.

It is yet a further object of the present invention to provide an improved mounting assembly wherein centrifugal loads acting on the snubber bearing associated with one blade assembly are reacted by a snubber bearing associated with a diametrically opposing blade assembly.

A mounting assembly is provided for securing a helicopter snubber bearing to a bearingless rotor assembly which includes a flexbeam connector mounted to a torque drive hub member. The mounting assembly includes a retainer fixture for mounting a retainer which engages an inner bearing race portion of the snubber bearing. The retainer fixture is mounted to the flexbeam connector and includes an inboard end portion, a restraint portion extending radially outboard thereof, and a seat portion disposed therebetween. The retainer is disposed in register with, and is compliantly bonded to, the seat portion of the retainer fixture. The restraint portion abuts an outboard end portion of the retainer for providing redundant retention thereof.

To reduce bondline stresses, the retainer includes at least one stress relieving lateral slot and at least one stress relieving forward slot, which cooperates with a radial slot formed in the retainer fixture, to reduce shear and tensile stresses in the compliant adhesive. Furthermore, the seat portion of the retainer fixture is reduced in width dimension to reduce flap and pitch induced shear stresses.

The mounting assembly also provides redundant load paths for transferring centrifugal loads acting on the snubber bearing to the flexbeam connector or, alternatively, to the torque drive hub member. A first redundant load path is established by bondedly mounting the retainer fixture to the flexbeam connector wherein the bondline area defined by the inboard end portion is larger than the bondline area defined by the seat portion of the retainer fixture. Should bondline failure occur in the bondline area defined by the seat portion, the retainer fixture transfers load inwardly to the inboard end portion of the retainer fixture. A second redundant load path is created by a cylindrical reaction pin which protrudes from the snubber bearing inner race portion and engages co-axially aligned central and redundant mounting apertures formed in the retainer and retainer fixture, respectively. The redundant mounting aperture is oversized relative to the central aperture such that centrifugal loads are primarily transferred through the central aperture and secondarily transferred to the redundant mounting aperture upon failure of the compliant adhesive. A third redundant load path is produced by secondary retention means which mounts the inboard end portion of the retainer to the torque drive hub, thereby transferring centrifugal loads directly thereto.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 1a depicts a side view of a helicopter bearingless rotor assembly and the primary components for imparting pitch control inputs thereto;

FIG. 1b is a top view of the helicopter bearingless rotor assembly (rotor only) of FIG. 1a;

FIG. 8a shows a profile view of an alternate embodiment of the present invention wherein the teachings thereof are applied to another variety of bearingless rotor assembly i.e., a cross-beam rotor;

FIG. 8b is a plan view of the mounting assembly of FIG. 8a.

BEST MODE FOR CARRYING OUT THE INVENTION

Figures 1A, 1B:
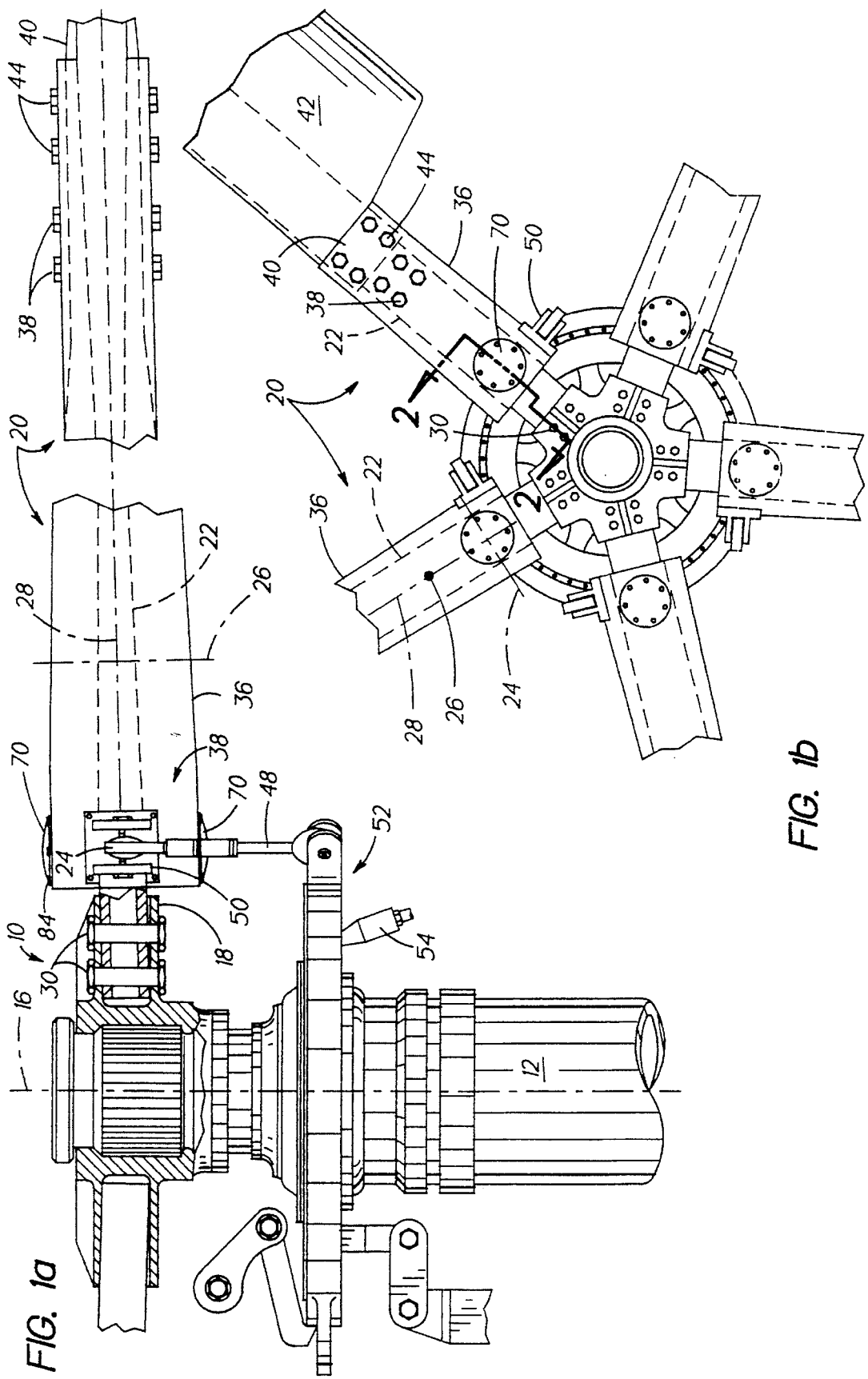

Referring now to the drawings wherein like reference characters identify corresponding or similar elements throughout the several views, FIGS. 1a and 1b show the relevant portions of a helicopter bearingless rotor assembly 10 which includes a drive shaft 12 which rotates about an axis of rotation 16. A torque drive hub member 18 is mounted to the drive shaft 12 and drives a plurality of rotor blade assemblies 20. Each blade assembly 20 includes a flexbeam connector 22 which is compliant about flap, lead-lag and pitch change axes 24, 26 and 28 so as to accommodate multi-directional displacement of the rotor blade assembly 20.

The flexbeam connector 22 is mounted at an inboard end to the torque drive hub member 18 by connecting bolts or pins 30 to react centrifugal forces acting on the rotor blade assemblies 20. While the invention will be described in terms of a rotor assembly 10 having pinned connection for mounting the flexbeam 22 to the torque drive hub 18, it will be seen that the teachings of the present invention are applicable to other varieties of bearingless rotors, such as a crossbeam rotor (described in greater detail hereinafter), wherein the flexbeam connector 22 extends across the rotational axis and is clamped to a torque drive hub member. The flexbeam connector, aptly renamed a "crossbeam", transfers the centrifugal loads generated by one blade assembly directly across the torque drive hub member to a diametrically opposing blade assembly. A crossbeam rotor assembly, therefore, eliminates the requirement for connecting pins 30.

A torque tube 36 envelopes the flexbeam connector 22 and is mounted thereto at its radially outer end by connecting bolts 38 and articulately mounted at an inner end by a pair of snubber bearings 70 (details of the snubber bearings and the associated mounting assembly therefor are discussed in subsequent views). The radial outer end of the torque tube 36 also mounts to and envelops the root end spar structure of each rotor blade airfoil 42 by a series of connecting bolts 44.

Pitch control inputs are imparted to the rotor blade assemblies 20 by pitch control rods 48 which are articulately mounted at an upper end to a pitch control horn 50 and pivotally mounted at an opposing end to an in-plane swashplate assembly 52. The swashplate assembly 52 receives pitch control inputs from at least three (3) control rod members 54 to position the swashplate in a desired planar orientation, thereby raising or lowering the pitch control rods 48 to effect pitch control.

Figure 2:
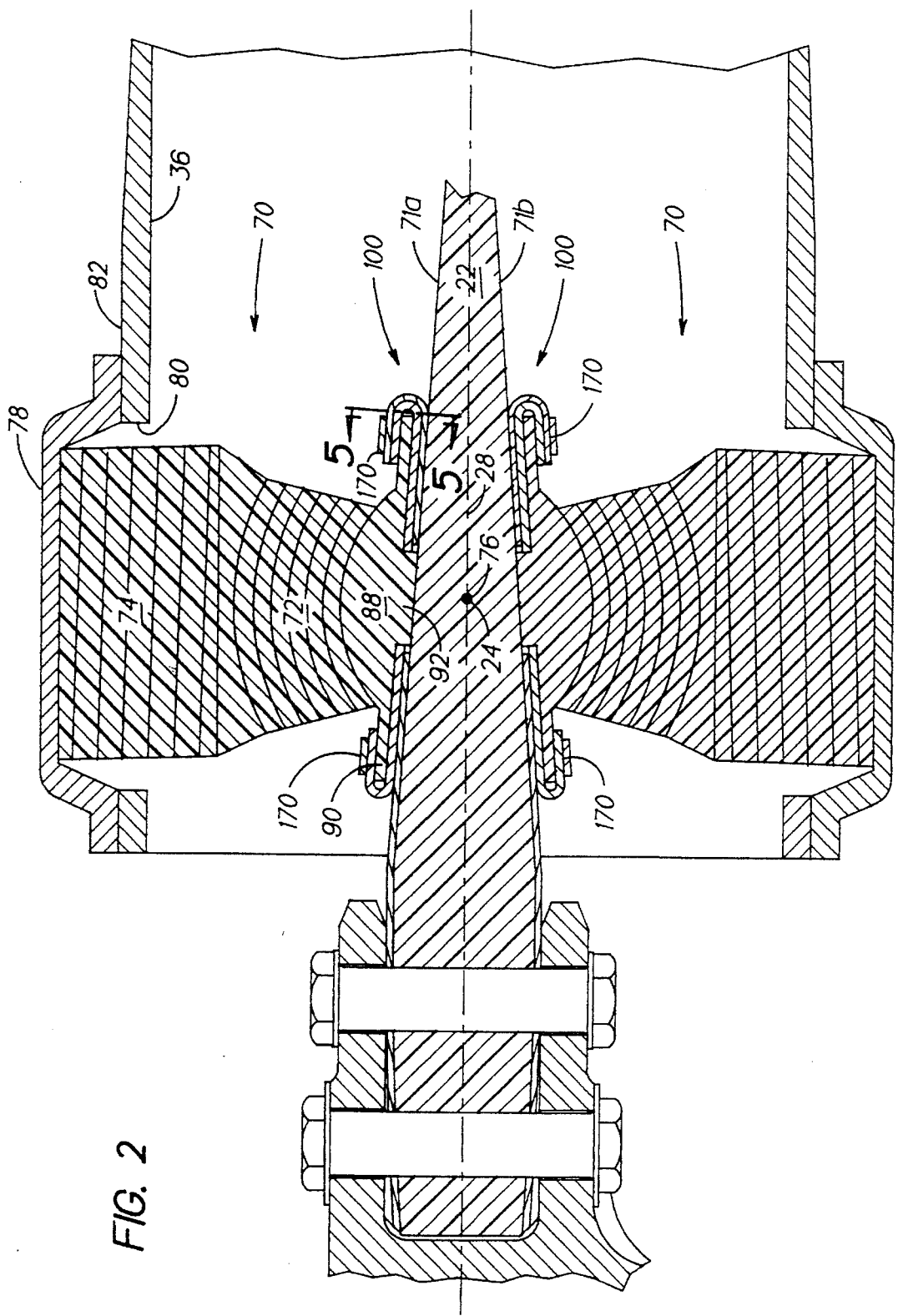
FIG. 2 shows a cross-section through line 2—2 of FIG. 1b illustrating upper and lower mounting assemblies according to the present invention in combination with snubber bearings.

FIG. 2 depicts a cross-sectional view along line 2—2 of FIG. 1b, wherein the snubber bearing 70 and a mounting assembly 100 of the present invention are more clearly illustrated. The torque tube 36 is centered between and mounted to the flexbeam connector. 22 by a pair of snubber bearings 70. Since the construction of the mounting assembly 100 for each of the snubber bearings 70 is essentially identical, only the mounting assembly 100 associated with the upper snubber bearing 70 will be described in detail. The snubber bearing 70 is preferably circular in cross-section and comprises an inner portion of spherical elastomeric laminates 72 and an outer portion of flat elastomeric laminates 74. The spherical laminates are concentric about a bearing focal point 76 which preferably intersects with the flap and pitch axes 24, 28 of the flexbeam connector 22. Such location ensures pure rotation about the flap axis 24 and prevents undesirable pitch-flap couplings which may otherwise impose tensile loads in the elastomeric laminates 72, 74. The flat elastomeric laminates 74 are preferably disposed atop the spherical elastomeric laminates 72 and function to permit a small degree of spanwise (radial) motion and a larger degree of edgewise or lead-lag motion. The flat laminates 74 are preferably comprised of high loss-factor elastomer material to dampen vibratory lead-lag motion of the rotor blade assemblies 20.

A preload plate member 78 is bonded to the uppermost elastomeric laminates 74 and forms the outer race of the snubber bearing 70. An aperture 80 is formed in the torque tube 36 and the snubber bearing 70 extends a select distance therethough for mounting to the external surfaces 82 of the torque tube 36. The combined height dimension of the spherical and flat laminates 72, 74 is prescribed such that a predetermined preload gap is initially formed between the preload plate member 78 and the external torque tube surface 82. As the preload plate member 78 is brought into mating contact with the torque tube 36 by preload bolts 84 (see FIG. 1a), the snubber bearing 70 is compressed a select amount to effect a desired preload within the elastomeric laminates 72, 74. It is common practice to preload snubber bearings so that the elastomeric laminates thereof remain in compression throughout the full range of required motion. This is necessary inasmuch as elastomeric material is characterized by low tensile strength and such preload or precompression prevents the imposition of tensile loads. Byrnes et al. U.S. Pat. No. 5,092,738 describes a bearingless rotor including a snubber bearing of the type described above including an assembly procedure for effecting preload.

The spherical elastomeric laminates 72 are bonded to an inner bearing race portion 88 which includes radially oriented tabs 90 and a centrally disposed cylindrical reaction pin 92. The tabs 90 and reaction pin 92 cooperate with the mounting assembly 100 of the present invention to transfer all snubber bearing loads thereto. The assembly procedure for securing the inner bearing race portion 88 to the mounting assembly 100 will be discussed in greater detail hereinafter.

Figure 3A:
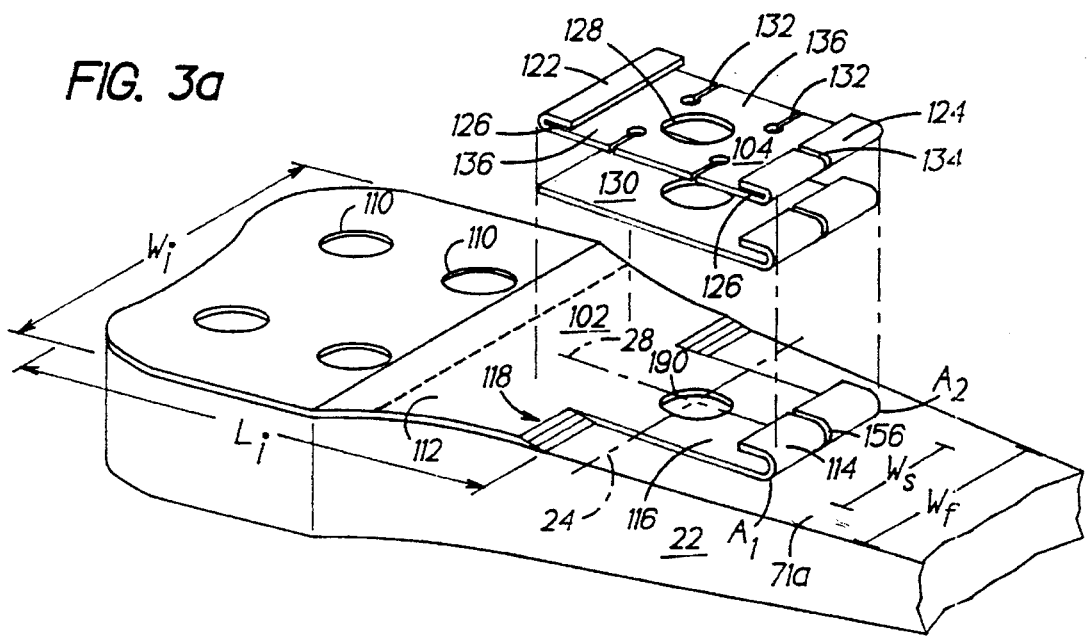
FIG. 3a shows an exploded perspective view of the mounting assembly of the present invention including a retainer fixture for mounting a retainer.

Referring to FIG. 3a, the mounting assembly for each snubber bearing includes a retainer fixture 102 having a generally J-shaped cross-section which receives and secures a retainer 104. The retainer fixture 102 is preferably bonded to a surface 71a of the flexbeam connector 22 and includes secondary retention apertures 110 for engaging the same connecting pins which are utilized for mounting the flexbeam connector 22. The retainer fixture 102, furthermore, includes an inboard end portion 112, a restraint portion 114 disposed outboard thereof, and a seat portion 116 disposed therebetween. The retainer fixture inboard end portion 112 is sized in width and length dimension Wi, and Li, respectively, to effect a large bondline area for providing maximum bond strength. Preferably, the width dimension Wi of the inboard end portion 112 closely matches the width dimension Wf of the flexbeam connector 22. The seat portion 116, however, is reduced in size, particularly width dimension Ws, to minimize bondline shear stresses. The severe flapwise and pitch change motions of the flexbeam connector 22 induce shear stresses in the retainer fixture 102 which vary in proportion to the distance from the flap and pitch axes 24, 28 (projected along the flexbeam connector surface 71a). The bondline area defined by the seat portion 116 is particularly vulnerable to bondline failure insofar as such location is characterized by large flap and pitch excursions. Accordingly, by reducing the width dimension of the seat portion 116, relative to the width dimension Wf of the flexbeam connector 22, the maximum or peak bondline shear stresses at locations $A_1$ and $A_2$ are reduced. The taper in width dimension from the inboard end portion 112 to the seat portion 116, i.e., from Wi to Ws, is effected by a stepped transition 118 wherein the edges thereof are tapered to reduce stress concentrations at the bondline interface 120.

Figure 3B:
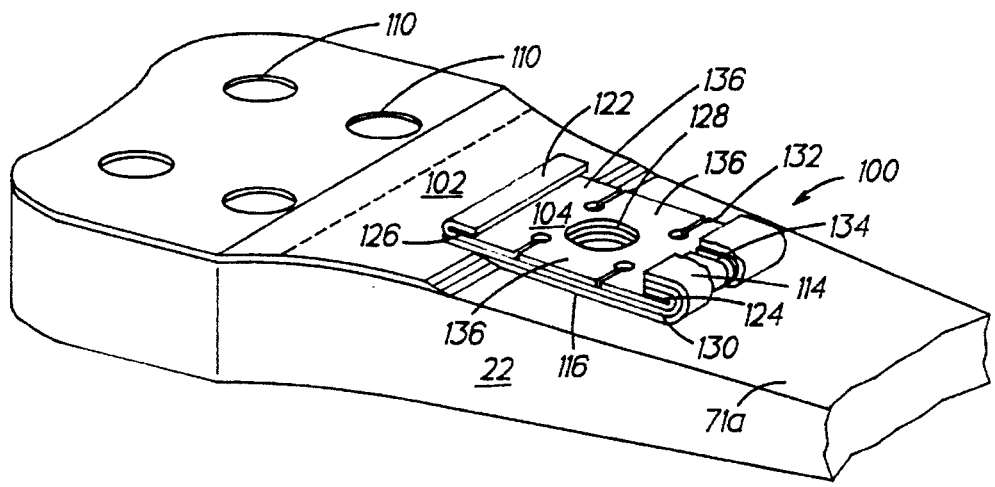
FIG. 3b shows a perspective view of the integrated mounting assembly of the present invention.

Referring to FIGS. 3a and 3b, the retainer 104 is secured to and disposed in register with the seat portion 116 of the retainer fixture 102 and abuts the restraint portion 114. The retainer 104 includes inboard and outboard end portions 122, 124 which define chordwise channels 126. The chordwise channels 126 and a central aperture 128 engage the radial tabs and cylindrical reaction pin, respectively, of the snubber bearing inner race portion for transferring all snubber bearing loads to the mounting assembly 100. Preferably, the restraint portion 114 is recurved for capturing the outboard end portion 124 of the retainer 104, hence precluding vertical disengagement of the retainer 104 due to overturning moment loads imposed by the snubber bearing.

To reduce shear stresses, the retainer 104 is secured to the retainer fixture 102 by means of a compliant adhesive 130 which is disposed between all mating surfaces, i.e., along the seat and recurved restraint portions 116, 114 of the retainer fixture 102. The compliant adhesive 130 isolates the retainer 104 from the retainer fixture 102 by accommodating differences in material properties, e.g., moduli, therebetween. To further reduce shear stresses, the retainer 104 includes stress relieving lateral and forward slots 132 and 134, respectively, to segregate the retainer 104 into retainer segments 136. The lateral and forward slots 132, 134 are preferably disposed about 40 cm (1.57 inches) apart or a similar distance from a free edge of the retainer 104. The retainer segments 136 reduce the shear stresses in the compliant adhesive 130, particularly along the retainer edges, by preventing the build-up of axial shear stresses therein.

Figure 4A:
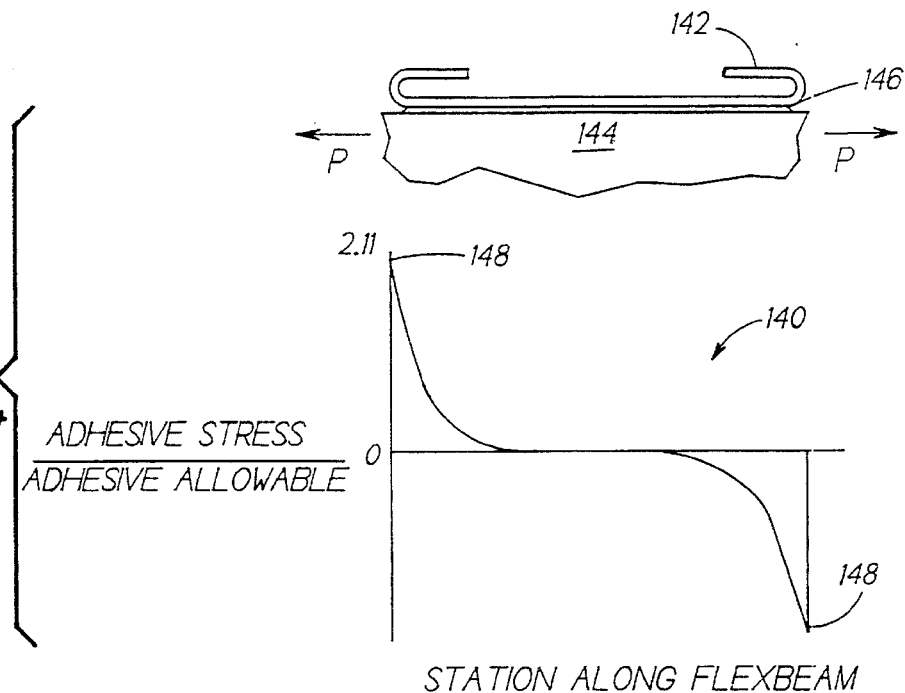
FIGS. 4a and 4b depict a comparison of the shear stress profile in the bondline areas of a prior art retainer vs. the shear stress profile of the retainer of the present invention.
Figure 4B:
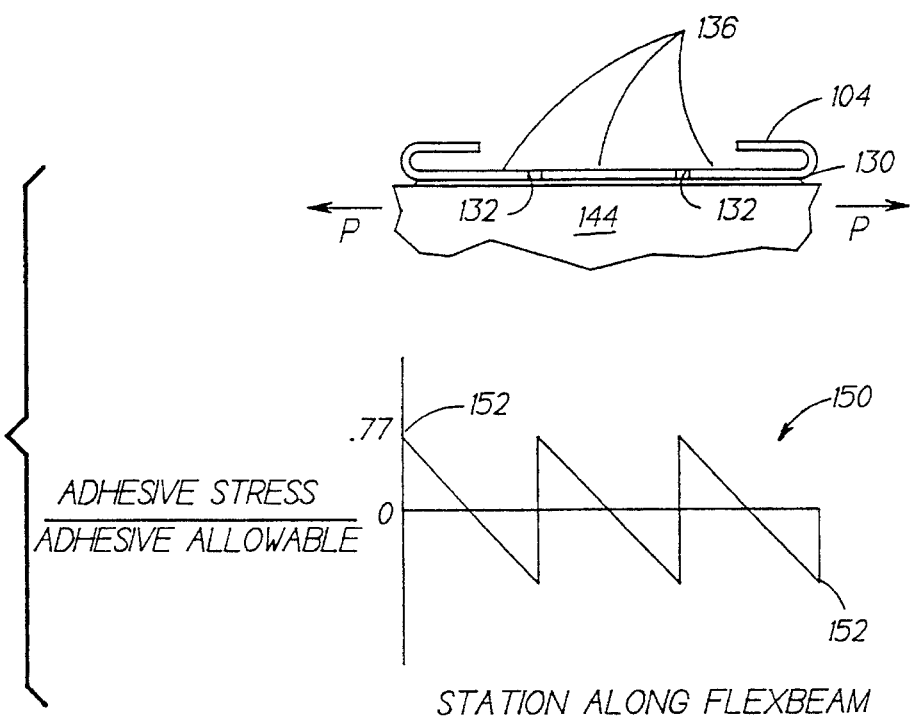

For a better understanding of the above described features, reference is made to FIGS. 4a and 4b wherein the shear stress profile 140 of a prior art retainer 142 is compared to the shear stress profile 150 of the retainer 104 of the present invention. To properly compare the stress profiles 140, 150, the ratio of shear stress to maximum allowable shear stress (associated with a particular bonding adhesive i.e., rigid vs. compliant) is provided. In FIG. 4a, a prior art metal retainer 142 is rigidly bonded to a composite flexbeam structure 144 utilizing a high strength adhesive 146. The axial strain or motion, indicated by horizontal load vector P, in the flexbeam structure 144 is resisted by the comparatively low elastic strain of the metal retainer 142. The shear stress profile shows the rapid development of high peak shear stresses 148 in the adhesive 146 caused by the strain disparity between the retainer 142 and underlying flexbeam structure 144. In FIG. 4b, the retainer 104 is bonded to the composite flexbeam structure 144 by a compliant adhesive 130, and furthermore, is segmented by lateral slots 132. The lateral slots 132 create retainer segments 136 which behave independently to reduce peak shear stresses 152 in the compliant adhesive 130. That is, the lateral slots 132 reduce the strain disparity by segmenting the retainer 104 into smaller subelements i.e., retainer segments 136. Accordingly, peak shear stresses 152 are reduced in proportion to the number of retainer segments 136. It will be appreciated, however, that the number of retainer segments 136 should be limited to maintain the structural integrity of the retainer 104.

Figure 5A:
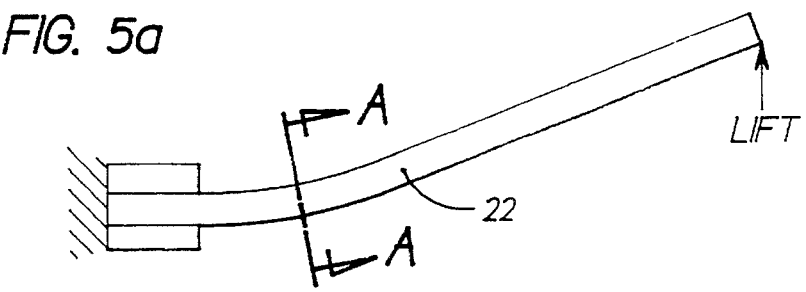
FIGS. 5a–5c illustrate anticlastic motion of a flexbeam connector and the features of the invention which accommodate such motion.
Figure 5B:
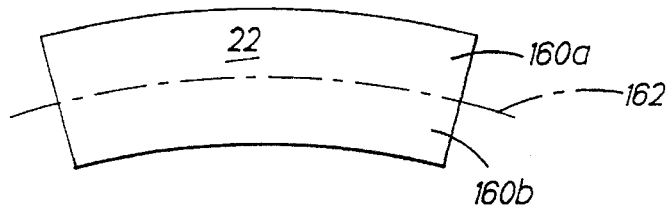
Figure 5C:
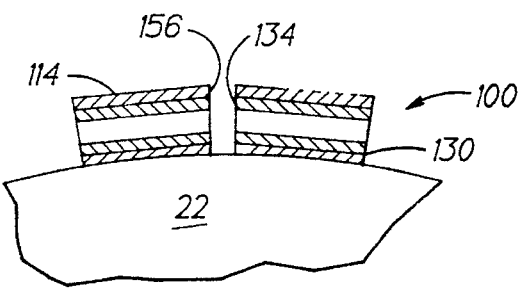

A radial slot 156 is also formed in the recurved restraint portion 114 (see FIG. 3a) and aligned with the forward slot 134 of the retainer 104 to prevent build-up of bondline tensile stresses due to anticlastic motion of the flexbeam connector. Anticlastic motion or, more accurately, curvature is produced by the poissons effect and becomes acute in structures subject to high bending loads. FIG. 5a shows the flapwise bending motion of the flexbeam connector 22 due to rotor blade lift loads. Referring to FIG. 5b, which is a cross-section along line A—A of FIG. 5a, the flapwise bending motion induces high axial compressive and tensile strain in the upper and lower portions 160a, 160b of the flexbeam connector 22, respectively, i.e., above and below the flapwise bending neutral axis 162. Consequently, lateral strain growth and shrinkage (or positive and negative strain) is induced in the upper and lower portions 160a, 160b, respectively, as a function of the poissons ratio of the flexbeam material. Accordingly, flapwise bending loads produce anticlastic curvature in the flexbeam connector 22 due to the differences in lateral strain between upper and lower portions 160a, 160b thereof. FIG. 5c is a cross section taken along line 5—5 of FIG. 2 wherein the radial and forward slots 156, 134 of the recurved restraint portion 114 and outboard end portion 124 of the retainer 104, respectively, cooperate to accommodate anticlastic curvature. The aligned slots 156, 134 reduce the stiffness of the mounting assembly 100 in the area of the restraint portion 114 to reduce tensile stresses in the compliant adhesive 130.

Figure 6:
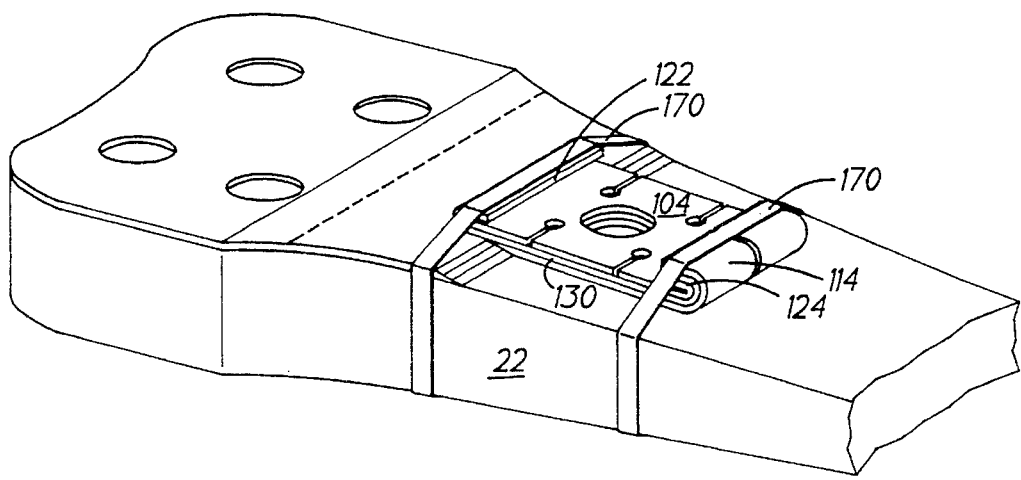
FIG. 6 depicts the use of strap members for providing lateral retention of the retainer and improving tensile strength in the bondline areas which mount the retainer fixture and the retainer.

FIG. 6 and FIG. 2 show the optional use of strap members 170 to provide redundant lateral retention of the retainer 104 and improve the tensile strength of the underlying bond line areas. The strap members 170 circumscribe the flexbeam connector 22 and cooperate with a complementary pair of snubber bearing mounting assemblies 100. The strap members 170 are, furthermore, disposed over the mounting assemblies 100 in areas corresponding to the inboard and outboard end portions 122, 124 of the retainer 104. During assembly, it is desirable to impose a predetermined tensile load in the strap members 170, thereby preloading the underlying compliant adhesive 130.

While the flexbeam connector 22 of the present invention may be fabricated from a variety of materials having the requisite strength and material properties for accommodating the various loads and motions of a helicopter rotor, the preferred flexbeam connector 22 is comprised of fiber-reinforced resin matrix composite material such as that described in commonly-owned U.S. Pat. No. 5,431,538. More specifically, the flexbeam connector 22 is comprised predominately of high strain allowable (elongation) fibers such as fiberglass in a resin matrix.

Insofar as flapwise bending strain is maximum along the upper and lower surfaces 71a and 71b of the flexbeam connector 22, it is desirable to employ similar high elongation composite materials in the retainer fixture 102 and the retainer 104. Such composite materials provide thermal and strain compatibility between components to reduce bondline shear stresses. For example, for the embodiment described herein, a compatible retainer fixture 102 is comprised of eight unidirectional plies of S2-glass reinforced resin matrix composite material having a total thickness of about 0.125 cm (0.048 inches). The S2-glass fiber reinforcement is a fiberglass filament, manufactured by Owens-Corning Fiberglas Corp. located in Toledo, Ohio, and has a modulus of about $8.7 \times 10^{10} N/m^2$ ($12.6 \times 10^6$ psi). The unidirectional plies (or fibers) are arranged to form a quasi-isotropic laminate i.e., equal strength along orthogonal axes, thereby producing a low modulus fiberglass structure which closely matches the modulus of the underlying flexbeam connector 22. A compatible retainer 104 is comprised of eleven plies of woven E-glass reinforced resin matrix composite material having a total thickness of about 0.254 cm (0.1 inches.) The E-glass fiber reinforcement is a fiberglass filament produced by Owens Corning Fiberglas Corp. and has a modulus of about $7.2 \times 10^{10} N/m^2$ ($14.5 \times 10^6$ psi). The woven plies (or fibers) are arranged to form a quasi-isotropic laminate which produces a toughened fiberglass structure. Such woven material is best suited for withstanding installation and operational loads imposed by the radial tabs 90 and cylindrical reaction pin 92 of the snubber bearing inner race portion 88.

The strap members 170 are preferably comprised of fiber reinforced resin matrix composite material wherein the fibers thereof are wrapped under tension to effect a preload in the compliant adhesive. For example, S2-glass fibers which are wrapped under a tensile load of about 44.5N (10 lbs) to about 67N (15 lbs) to provide the desired preload in the compliant adhesive.

The manufacturing technique and assembly procedure for fabricating such composite articles will vary depending upon the chosen fiber reinforcement, resin systems and bonding agents. However, in the preferred embodiment, the flexbeam connector 22, retainer fixture 102 and retainer 104 are precured composite components which are subsequently bonded using conventional bonding techniques. Adhesives useful for bonding the retainer fixture 102 to the flexbeam connector 22 are high strength film adhesives, such as AF 163 manufactured by 3M located in St. Paul, Minn., which are oven cured at 121° C. (250° F.) for approximately 90–120 mins. Compliant adhesives useful for securing the retainer 104 to the retainer fixture 102 are room temperature curing elastomer adhesives having a shear modulus between about $1.4\times10^6$ N/m² (200 psi) to about $6.9\times10^6$ N/m² (1000 psi) and a maximum allowable shear strain of about 1.5 cm/cm (1.5 in/in.) The strap members 170 are preferably wet wound, i.e., pulled through a resin bath immediately prior to winding, and cured at room temperature.

While the mounting assembly 100 described herein is best suited for main rotor applications, it will be understood that the invention is applicable to other bearingless rotor assemblies such as a tail rotor assembly. Furthermore, while the mounting assembly and flexbeam connector of the present invention are preferably comprised of composite materials for providing weight efficiency and structural reliability, it will be understood that metallic materials may be employed while remaining within the spirit and scope of the invention. Moreover, while the preferred method for mounting the retainer fixture to the underlying flexbeam connector is a bonded attachment, it will be appreciated that other fastening means such as a bolted attachment or clamping arrangement may be employed.

The assembly procedure for mounting the inner bearing race portion 88 to the retainer 104 includes the steps of: lowering the snubber bearing 70 through the torque tube aperture 80 toward the flexbeam connector 22 such that the tab members 90 are initially oriented between the chordwise channels 126 and generally parallel thereto, disposing the cylindrical reaction pin 92 in the central aperture 128 of the retainer 104, rotating the snubber bearing 90° such that the radial tab members 90 engage the chordwise channels 126 and, fastening the preload plate 78 to the torque tube 36. The tab members 90, therefore, react flap and pitch induced bending loads while the reaction pin 92 reacts all axial and edgewise shear loads.

Figure 7A:
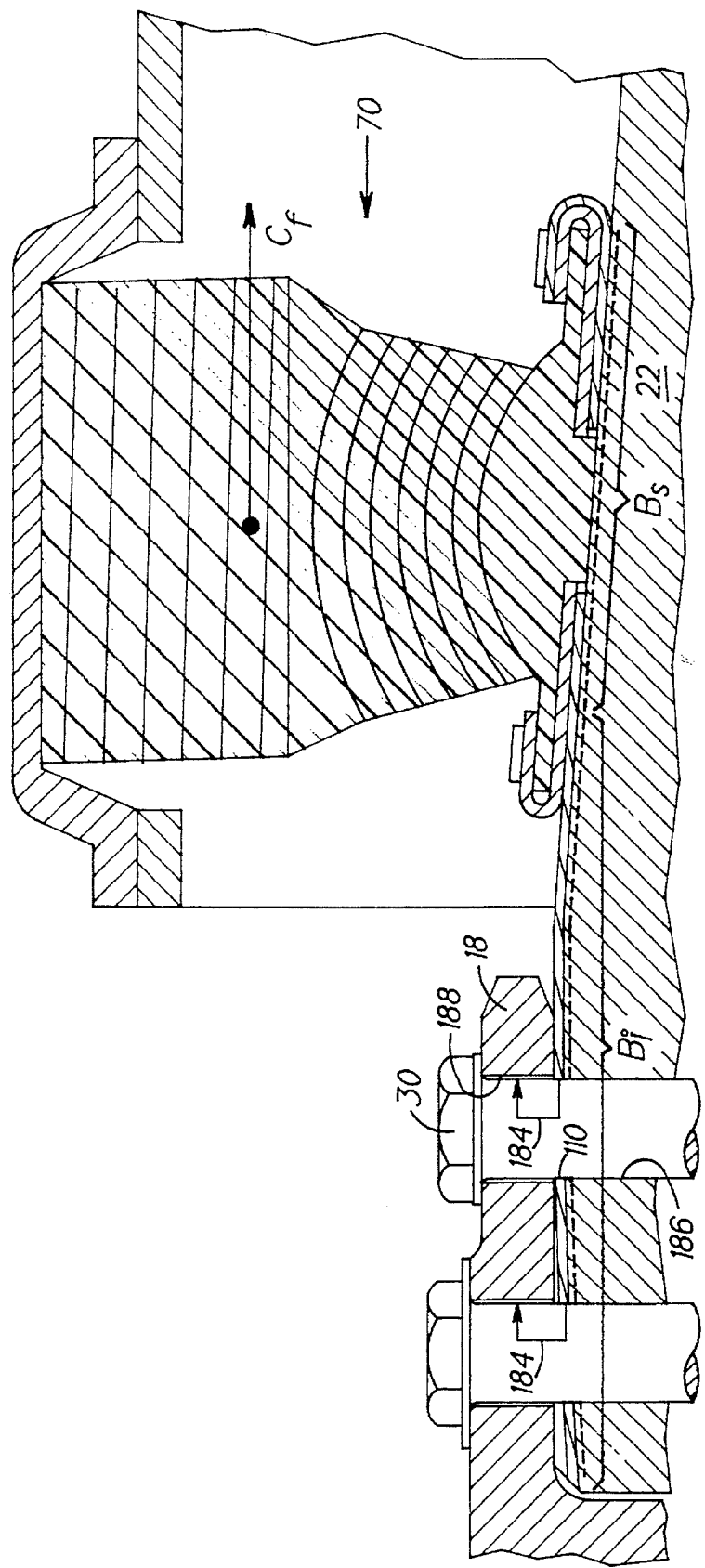
FIGS. 7a and 7b show the redundant load paths for reacting centrifugal forces acting on a snubber bearing when employing the mounting assembly of the present invention.

The mounting assembly 100 of the present invention provides separate load paths for reacting centrifugal loads acting on the snubber bearing 70. In FIG. 7a, centrifugal load, indicated by resultant vector Cf, is primarily transferred to the flexbeam connector 22 across the bondline area Bs defined by the length and width dimensions of the retainer fixture seat portion. A failure occurring in the seat portion bondline area Bs, results in centrifugal loads being transferred inwardly to the inboard end portion of the retainer fixture. At this location, the bondline area Bi defined by the length and width dimensions of the inboard end portion is larger and is capable of reacting higher loads. Furthermore, the bondline area Bi defined by the inboard end portion is exposed to lower strain levels i.e., flexbeam connector motions, and is less susceptible to bondline failure.

Should bondline failure propagate beyond bondline area Bi, the retainer fixture transfers the load directly back along line 184 to the torque drive hub member 18. While such secondary retention can be accomplished by a variety of mechanical means, it is preferable to mount the retainer fixture to the torque drive hub member 18 utilizing the same pinned connection for mounting the flexbeam connector 22. In the preferred embodiment, the connecting pin 30 is disposed through aligned apertures 186, 188 formed in the root end of the flexbeam connector 22 and the torque drive hub member 18, respectively, and, additionally through the secondary retention apertures 110 in the inboard end portion of the retainer.

Figure 7B:
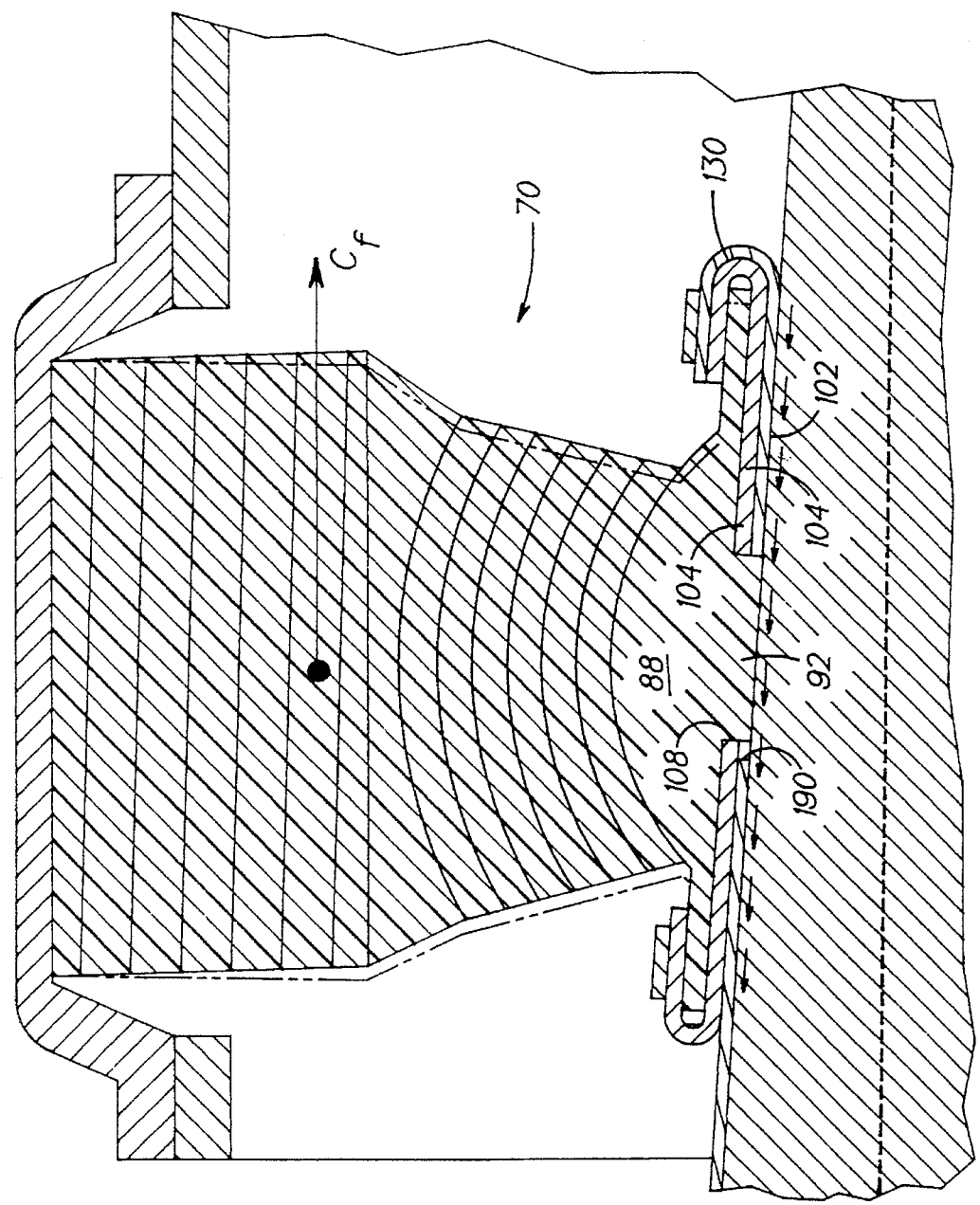

FIG. 7b shows yet another redundant load path provided by a redundant mounting aperture 190 (also shown in FIG. 3b) formed in the seat portion 116 of the retainer fixture 102. This view shows a failure having occurred in the compliant adhesive 130 which, consequently, causes the retainer 104 and snubber bearing 70 to shift under the influence of centrifugal load Cf. During normal operating conditions, the redundant mounting aperture 190, is co-axially aligned with the central aperture 128 of the retainer 104 (see FIG. 2). Furthermore, the redundant mounting aperture 190 accepts the lower portion of the cylindrical reaction pin 92 of the snubber bearing inner race 88 and is slightly oversized relative to the central aperture 128 such that a small circumferential gap is formed between the reaction pin 92 and the redundant mounting aperture 190. The small circumferential gap prevents direct load transfer into the retainer fixture 102 via the reaction pin 92 but permits transmission through the retainer 104. Should, however, a failure occur in the restraint portion 114 of the retainer fixture 102, the cylindrical reaction pin 92 will engage the redundant mounting aperture 190 for transferring the load directly into the retainer fixture 102.

FIG. 8a depicts an alternate embodiment of the invention wherein the teachings are applied to a crossbeam bearingless rotor assembly. The same reference numerals will be used to describe elements corresponding to both varieties of bearingless rotor assemblies (reference numerals having superscripts will be used to denote elements in opposed relation). The rotor assembly 10 has a rotational axis 16 and includes a crossbeam member 200 which is functionally equivalent to radially opposed flexbeam connectors 22, 22' described hereinabove. The crossbeam member 200 extends across the rotational axis 16 and couples oppositely disposed rotor blade assemblies 20, 20'. Whereas the previously-described bearingless rotor assembly transfers centrifugal loads to the central torque drive hub member 18, the crossbeam member 200 extends through the torque drive hub member 18 and transfers loads directly across the rotational axis 16.

FIG. 8b depicts a plan view of the mounting assembly 100 wherein the inboard end portions 112, 112' of opposed mounting assemblies 100, 100' are contiguous to form a central strap portion 210 which extends across the rotational axis 16. Similar to the crossbeam member, the central strap portion 210 can be viewed as functionally replacing opposed inboard end portions 112, 112' of opposed retainer fixtures 102, 102'. Furthermore, the opposed mounting assembly 100' includes the same elements, e.g., retainer 104', restraint portion 114', seat portion 116' etc., as the above described mounting assembly 100. The redundant load paths for transferring centrifugal load into the flexbeam connector 22 have been previously described, however, should the mounting assemblies 100, 100' become disengaged from the crossbeam member 210, centrifugal loads Cf acting on one snubber bearing 70 (see FIG. 8a) are transferred across the central strap portion 210 and counteracted by the centrifugal loads Cf acting on the other snubber bearing 70'.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A mounting assembly (100) for securing a helicopter snubber bearing (70) to a bearingless rotor assembly (10) and for establishing a redundant load path for reacting centrifugal loads acting on tile snubber bearing (70), the bearingless rotor assembly (10) having a flexbeam connector (22) mounted to a torque drive hub member (18), the snubber bearing (70) furthermore having an inner bearing race portion (88), comprising:

a retainer fixture (102) mounted to the flexbeam connector (22), said retainer fixture (102) having an inboard end portion (112), a restraint portion (114) extending radially outboard thereof, and a seat portion (116) disposed therebetween;

a retainer (104) disposed in register with said seat portion (116) of said retainer fixture (102) and having inboard and outboard end portions (122, 124), said outboard end portion (124) abutting said restraint portion (114), said retainer (104) furthermore engaging the inner bearing race portion (88) of the snubber bearing (70); and, a compliant adhesive (130) for bonding said retainer (104) to said retainer fixture (102).

2. The mounting assembly (100) according to claim 1 wherein said compliant adhesive (130) has a modulus between about $1.4 \times 10^6 N/m^2$ (200 psi) to about $6.9 \times 10^6 N/m^2$ (1000 psi).

3. The mounting assembly (100) according to claim 1 wherein said restraint portion (114) is recurved for capturing said outboard end portion (124) of the retainer (104).

4. The mounting assembly (100) according to claim 1 wherein said retainer (104) includes at least one stress relieving lateral slot (132) to reduce bondline shear stresses between said retainer fixture (102) and said retainer (104).

5. The mounting assembly (100) according to claim 4 wherein said retainer fixture (102) includes at least one stress relieving radial slot (156) and wherein said retainer (104) includes at least one stress relieving forward slot (134) in register with said radial slot (156) to reduce bondline tensile stresses caused by anticlastic motion of the flexbeam connector (22).

6. The mounting assembly (100) according to claim 1 wherein the inner bearing race portion (88) includes a cylindrical reaction pin (92) and wherein said retainer (104) includes a central aperture (128) and wherein said retainer fixture (102) includes a redundant mounting aperture (190), said redundant mounting aperture (190), furthermore, being co-axially aligned with and oversized relative to said central aperture (128), said cylindrical reaction pin (92) being disposed in said central aperture (128) and said redundant mounting aperture (190) such that centrifugal loads acting on the snubber bearing (70) are primarily transferred through said central aperture (128) of said retainer (104) and secondarily transferred to said redundant mounting aperture (190) upon failure of said compliant adhesive (130).

7. The mounting assembly (100) according to claim 1 further comprising, strap members (170) disposed over said inboard and outboard end portions (122, 124) of said retainer (104) and circumscribing the flexbeam connector (22) for redundant retention of said retainer (104).

8. A mounting assembly (100) for securing a helicopter snubber bearing (70) to a bearingless rotor assembly (10) and for establishing a redundant load path for reacting centrifugal loads acting on the snubber bearing (70), the bearingless rotor assembly (10) having a flexbeam connector (22) mounted to a torque drive hub member (18), the snubber bearing (70) furthermore having an inner bearing race portion (88), comprising:

a retainer fixture (102) mounted to the flexbeam connector (22), said retainer fixture (102) having an inboard end portion (112), a restraint portion (114) extending radially outboard thereof, and a seat portion (116) disposed therebetween;

a retainer (104) disposed in register with said seat portion (116) of said retainer fixture (102) and having inboard and outboard end portions (122, 124), said outboard end portion (124) abutting said restraint portion (114), said retainer (104) furthermore engaging the inner bearing race portion (88) of the snubber bearing (70);

an compliant adhesive (130) for bonding said retainer (104) to said retainer fixture (102); and, secondary retention means (30, 110) for mounting said inboard end portion (112) to the torque drive hub member(18);

wherein the centrifugal loads acting on the snubber bearing (70) are primarily transferred through the flexbeam connector (22) and secondarily transferred through said retainer fixture (102) for reaction by the torque drive hub member (18).

9. The mounting assembly (100) according to claim 8 wherein said compliant adhesive (130) has a modulus between about $1.4 \times 10^6 N/m^2$ (200 psi) to about $6.9 \times 10^6 N/m^2$ (1000 psi).

10. The mounting assembly (100) according to claim 8 wherein said restraint portion (114) is recurved for capturing said outboard end portion (124) of the retainer (104).

11. The mounting assembly (100) according to claim 8 wherein said retainer (104) includes at least one stress relieving lateral slot (132) to reduce bondline shear stresses between said retainer fixture (102) and said retainer (104).

12. The mounting assembly (100) according to claim 11 wherein said retainer fixture (102) includes at least one stress relieving radial slot (156) and wherein said retainer (104) includes at least one stress relieving forward slot (134) in register with said radial slot (156) of said retainer fixture (102) to reduce bondline tensile stresses caused by anticlastic motion of the flexbeam connector (22).

13. The mounting assembly (100) according to claim 8 wherein the inner bearing race portion (88) includes a cylindrical reaction pin (92) and wherein said retainer (104) includes a central aperture (128) and wherein said retainer fixture (102) includes a redundant mounting aperture (190), said redundant mounting aperture (190), furthermore, being co-axially aligned with and oversized relative to said central aperture (128), said cylindrical reaction pin (92) being disposed in said central aperture (128) and said redundant mounting aperture (190) such that centrifugal loads acting on the snubber bearing (70) are primarily transferred through said central aperture (128) of said retainer (104) and secondarily transferred to said redundant mounting aperture (190) upon failure of said compliant adhesive (130).

14. The mounting assembly (100) according to claim 8 further comprising, strap members (1 70) disposed over said inboard and outboard end portions (122, 124) of said retainer (104) and circumscribing the flexbeam connector (22) for redundant retention of said retainer (104).

15. The mounting assembly (100) according to claim 8 wherein the flexbeam connector (22) is mounted to the torque drive hub member (18) by means of a pinned connection, said pinned connection including said flexbeam connector (22) having a root end aperture (186), said torque drive hub member (18) having an aperture (188) and a connecting pin (30) disposed through said apertures (186, 188), and wherein said secondary retention means (30, 110) includes said inboard end portion (112) of said retainer fixture (102) having a secondary retention aperture (110) wherein said connecting pin (30) additionally engages said secondary retention aperture (110).

16. A mounting assembly (100) for securing a helicopter snubber bearing (70) to a bearingless rotor assembly (10) and for establishing a redundant load path for reacting centrifugal loads acting on the snubber bearing (70), the bearingless rotor assembly (10) having a flexbeam connector (22) mounted to a torque drive hub member (18), the snubber bearing (70) furthermore having an inner bearing race portion (88), comprising:

a retainer fixture (102) bonded to the flexbeam connector (22) and having an inboard end portion (112), a restraint portion (114) extending radially outboard thereof, and a seat portion (116) disposed therebetween, said inboard end and seat portions (112), (116) defining bondline areas (Bi, Bs), said bondline area (Bi) of said inboard end portion (112) being greater than said bondline area (Bs) of said seat portion (116);

a retainer (104) disposed in register with said seat portion (116) of said retainer fixture (102) and abutting said restraint portion (114) thereof, said retainer (104) furthermore engaging the inner bearing race portion (88) of the snubber bearing (70); and, an adhesive (130) compliantly bonding said retainer (104) to said retainer fixture (102);

wherein the centrifugal loads acting on the snubber bearing (70) are primarily transferred to the flexbeam connector (22) by said bondline area (Bs) of said seat portion (116) and redundantly transferred to the flexbeam connector (22) by said bondline area (Bi) of said inboard end portion (112).

17. The mounting assembly (100) according to claim 16 wherein said seat portion (116) of said retainer fixture (102) has a characteristic width dimension (Ws) and wherein said flexbeam connector (22) has characteristic width dimension (Wf), said width dimension (Wf) of said flexbeam connector (22) being greater than said width dimension (Ws) of said seat portion (116) for reducing shear stresses induced by flap and pitch motions of the flexbeam connector (22).

18. The mounting assembly (100) according to claim 1 wherein the bearingless rotor assembly (10) has a rotational axis (16) and includes opposed rotor blade assemblies (20, 20') each including a flexbeam connector (22, 22') having a snubber bearing (70, 70') associated therewith and wherein the opposed flexbeam connectors (22, 22') define a crossbeam member (200), said mounting assembly further comprising:

an opposed mounting assembly (100') including a retainer fixture (102') mounted to the crossbeam member (200), said retainer fixture (102') having an inboard end portion (112'), a restraint portion (114') extending radially outboard thereof, and a seat portion (116') disposed therebetween;

a retainer (104') disposed in register with said seat portion (116') of said retainer fixture (102') and having inboard and outboard end portions (122', 124'), said outboard end portion (124') abutting said restraint portion (114'), said retainer (104') furthermore engaging the inner bearing race portion (88') of the snubber bearing (70'); and, a compliant adhesive (130) for bonding said retainer (104') to said retainer fixture (102');

said inboard end portions (112, 112') of said retainer fixtures (102, 102') being contiguous to form a central strap portion (210), said crossbeam member (200) and said central strap portion (210) extending across said rotational axis (16), wherein centrifugal loads acting on tile opposed snubber bearings (70, 70') are primarily transferred through the crossbeam member (200) and redundantly transferred across said central strap portion (210) from one snubber bearing (70) to the other snubber bearing (70').

* * * * *